: US006961154B2

United States Patent
Sugano

(10) Patent No.: US 6,961,154 B2
(45) Date of Patent: Nov. 1, 2005

(54) IMAGE READING APPARATUS AND IMAGE-FORMING APPARATUS INCORPORATING THE IMAGE-READING APPARATUS

(75) Inventor: Masashi Sugano, Tokyo (JP)

(73) Assignee: Konica Corporation, Tokyo (JP)

( * ) Notice: Subject to any disclaimer, the term of this patent is extended or adjusted under 35 U.S.C. 154(b) by 811 days.

(21) Appl. No.: 09/758,002

(22) Filed: Jan. 9, 2001

(65) Prior Publication Data

US 2002/0015195 A1 Feb. 7, 2002

(30) Foreign Application Priority Data

Jan. 13, 2000 (JP) ........................................ 2000/004524

(51) Int. Cl.[7] .............................................. H04N 1/04
(52) U.S. Cl. ...................... 358/475; 358/496; 358/497; 358/498; 358/474; 399/367; 399/379; 399/380; 399/205; 399/206
(58) Field of Search ................................ 358/475, 496, 358/498, 497, 401, 501, 474, 494, 509, 487, 505, 506; 399/367, 379, 380, 205, 206, 208, 202, 203, 215, 177, 372; 355/75, 67; 382/312, 319, 318; 250/234–236

(56) References Cited

U.S. PATENT DOCUMENTS 5,373,352 A * 12/1994 Uto .............................. 399/203
5,657,113 A * 8/1997 Ono et al. ..................... 355/75

* cited by examiner

Primary Examiner—Cheukfan Lee
(74) Attorney, Agent, or Firm—Frishauf, Holtz, Goodman & Chick, P.C.

(57) ABSTRACT

An image-reading apparatus for reading an image formed on a document is provided which includes an automatic document feeder, a dynamic-document reading section, a static-document reading section, and a document-covering member. A light source mechanism irradiates an exposing light onto the document at either the dynamic-document reading section or the static-document reading section. When the automatic document feeder is opened with regard to the dynamic-document reading section and a stationary document is placed on the static-document reading section to read the image formed on the document, a controller controls the light source mechanism so that substantially none of the exposing light emitted from the light source mechanism leaks outside through the dynamic-document reading section.

7 Claims, 5 Drawing Sheets

IMAGE READING APPARATUS AND IMAGE-FORMING APPARATUS INCORPORATING THE IMAGE-READING APPARATUS

BACKGROUND OF THE INVENTION

The present invention relates to an image-forming apparatus incorporating both a static-document reading section and a dynamic-document reading section, and specifically relates to an image-reading apparatus which can prevent a leakage of exposing light emitted from a reading lamp when opening an automatic document feeder of the dynamic-document reading section, and an image-forming apparatus incorporating the image-reading apparatus.

The image-reading apparatus, serving as an independent scanner or incorporated in a facsimile, a copier, etc., has been used for reading an image formed on a document, such as a paper, a film, etc., to output electronic signals of the image. Image-reading apparatuses having an image-reading mechanism, in which exposing light is irradiated onto the document to read the image by detecting light reflected from the objective image, have been widely proliferated in the market. In the independent scanner, the digital-data read from the image are stored, to make it possible to edit or reuse them, while in the copier, a reproduced image is formed on a new paper, film, etc., based on the digital data read from the image.

Now, the image-reading apparatus will be detailed in the following, referring to an exemplified copier equipped with an automatic document reading mechanism.

The copier, equipped with the automatic document reading mechanism, comprises a static-document reading section in which an image-reading section, moving under the platen glass, reads an image from the document put stationary on a platen glass; an automatic document feeder for feeding the document; and a dynamic-document reading section in which the image-reading section, stopped at a fixed position, reads the image from the document being fed to the fixed position by the automatic document feeder.

When making a copy with the automatic document reading mechanism, the document is set on the automatic document feeder to read the document while automatically feeding the document. On the other hand, when making a copy with the static-document reading section, the document is set on the platen glass, and a platen cover, serving as a pressing means, is covered on the document to fix the document. It has been inconvenient, however, for the user to operate the abovementioned copier, since the platen cover and the automatic document feeder of the dynamic-document reading section are integrated into one body, resulting in the heavy weight of the platen cover. In addition, since the user opens and shuts the automatic document feeder of the dynamic-document reading section every time when putting the document on the platen glass and covering the platen cover, the shocks incurred on the automatic document feeder could cause malfunctions of the automatic document feeder.

To overcome the abovementioned drawback, it has been considered another structure of the copier, in which the platen cover is separated from the automatic document feeder of the dynamic-document reading section, so that, when making a copy from the document put on the platen glass, the user can operate the platen cover only, separately from the automatic document feeder, to push the document on the platen glass.

There have been the following problems, however, in the abovementioned copier in which the platen cover and the dynamic-document reading section can be separately operated.

Namely, in the dynamic-document reading section, the automatic document feeder for feeding the document and the light source mechanism for irradiating light to read the document are opposed each other with a document reading window located between them, and the document reading window is formed in the vicinity of the platen glass of the static-document reading section. Accordingly, when reading the document with the static-document reading section, sometimes, the light of the lamp, disposed in the light source mechanism for reading the document, leaks outside through the document reading window.

In such cases, various inconveniences have happened in such manners that, for instance, the wall or surroundings are abruptly illuminated with unnecessary light leaked from the lamp, or very strong light beams of the lamp abruptly penetrate into eyes of the operator or a person near the copier, etc.

SUMMARY OF THE INVENTION

To overcome the abovementioned drawbacks in conventional image-reading apparatus, it is an object of the present invention to provide an image-reading apparatus, which makes it possible to prevent leakage of unnecessary light through a window of a dynamic-document reading section.

Accordingly, to overcome the cited shortcomings, the abovementioned object of the present invention can be attained by image-reading apparatus and image-forming apparatus described as follow.

(1) An image-reading apparatus for reading an image formed on a document, comprising: an automatic document feeder for automatically feeding the document; a dynamic-document reading section for reading the image while the automatic document feeder is feeding the document; a static-document reading section for reading the image while the document is put stationary on the static-document reading section; a document-covering member for covering and pushing the document onto the static-document reading section, the document-covering member being capable of opening and shutting with regard to the static-document reading section when the automatic document feeder is opened with regard to the dynamic-document reading section; a light source mechanism for irradiating an exposing light onto the document at either the dynamic-document reading section or the static-document reading section, the light source mechanism being stationary under the dynamic-document reading section to irradiate the exposing light onto the document, being moved by the automatic document feeder, through the dynamic-document reading section, or the light source mechanism moving under the static-document reading section to scan the document by irradiating the exposing light through the static-document reading section; an image-capturing element for receiving a light reflected from the document to convert the image into electronic signals; and a controller for controlling moving and light-emitting actions of the light source mechanism; wherein, when the automatic document feeder is opened with regard to the dynamic-document reading section and the document is put stationary on the static-document reading section to read the image formed on the document, the controller controls the light source mechanism so that substantially none of the exposing light emitted from the light source mechanism leaks outside through the dynamic-document reading section.

In the present invention, with regard to the requirement that "substantially none of the exposing light leaks outside", it may be most preferable that the light perfectly does not leak outside. However, this requirement includes a condition in which weak light slightly leaks outside. More concretely, in the slightly leaking condition, when the automatic document feeder is opened, and an image on a document placed on the static-document reading section is read, the luminous intensity measured through the dynamic-document reading section is not higher than 5000 (1x), and preferably is not higher than 1000 (1x).

(2) The image-reading apparatus of item 1, wherein, when the document is put stationary on the static-document reading section to read the image formed on the document, the light source mechanism moves to the static-document reading section from the dynamic-document reading section, and the controller controls a timing to start emitting the exposing light from the light source mechanism so that substantially none of the exposing light emitted from the light source mechanism leak outside through the dynamic-document reading section.

(3) The image-reading apparatus of item 2, wherein, either when the light source mechanism moves a predetermined distance toward the static-document reading section from a start position located at the dynamic-document reading section, or when a predetermined time has elapsed after the light source mechanism starts moving toward the static-document reading section, the controller activates the light source mechanism to emit the exposing light.

(4) The image-reading apparatus of item 3, wherein the controller changes a value of the predetermined distance or the predetermined time, corresponding to a moving velocity of the light source mechanism, the start position of the light source mechanism or a reading magnification ratio.

(5) The image-reading apparatus of item 2, further comprising: a light-source position detector, disposed at a predetermined position, for detecting the light source mechanism in midcourse of moving; wherein the controller controls the light-emitting actions of the light source mechanism based on detected results of the light-source position detector.

(6) The image-reading apparatus of item 5, wherein the predetermined position is equivalent to a detecting position at which the light-source position detector detects the light source mechanism in midcourse of moving between the dynamic-document reading section and the static-document reading section.

(7) An image-forming apparatus comprising the image-reading apparatus of item 1, wherein the image-forming apparatus forms an image on a recording material, based on image data generated by the image-reading apparatus.

(8) An image-reading apparatus for reading an image formed on a document, comprising: an automatic document feeder for automatically feeding the document; a dynamic-document reading section for reading the image while the automatic document feeder is feeding the document; a static-document reading section for reading the image while the document is put stationary on the static-document reading section; a document-covering member for covering and pushing the document onto the static-document reading section, the document-covering member being capable of opening and shutting with regard to the static-document reading section when the automatic document feeder is opened with regard to the dynamic-document reading section; a light source mechanism for irradiating an exposing light onto the document at either the dynamic-document reading section or the static-document reading section, the light source mechanism being stationary under the dynamic-document reading section to irradiate the exposing light onto the document, being moved by the automatic document feeder, through the dynamic-document reading section, or the light source mechanism moving under the static-document reading section to scan the document by irradiating the exposing light through the static-document reading section; an image-capturing element for receiving a light reflected from the document to convert the image into electronic signals; and a shutter member being movable between a shading position, at which the shutter member shades the exposing light emitted from the light source mechanism, and a non-shading position, at which the shutter member does not shade the exposing light emitted from the light source mechanism; wherein, when the document is moved by the automatic document feeder at the dynamic-document reading section to read the image formed on the document, the shutter member is positioned at the non-shading position, while when the document is put stationary on the static-document reading section to read the image formed on the document, the shutter member is positioned at the shading position.

(9) The image-reading apparatus of item 8, wherein the shutter member is movable in conjunction with moving actions of the light source mechanism.

(10) The image-reading apparatus of item 9, wherein the shutter member is urged to the shading position by an elastic member, and the light source mechanism moves the shutter member to the non-shading position in conjunction with its moving action from the static-document reading section to the dynamic-document reading section, while opposing to a urging force generated by the elastic member.

(11) The image-reading apparatus of item 8, wherein the shutter member comprises a cleaning member for cleaning the dynamic-document reading section while moving with the shutter member.

(12) The image-reading apparatus of item 8, wherein the shutter member is disposed at a side of the dynamic-document reading section opposite to another side above which the automatic document feeder is arranged.

(13) An image-forming apparatus comprising the image-reading apparatus of item 8, wherein the image-forming apparatus forms an image on a recording material, based on image data generated by the image-reading apparatus.

(14) An image-reading apparatus for reading an image formed on a document, comprising: an automatic document feeder for automatically feeding the document; a dynamic-document reading section for reading the image while the automatic document feeder is feeding the document; a static-document reading section for reading the image while the document is put stationary on the static-document reading section; a document-covering member for covering and pushing the document onto the static-document reading section, the document-covering member being capable of opening and shutting with regard to the static-document reading section when the automatic document feeder is opened with regard to the dynamic-document reading section; a light source mechanism for irradiating an exposing light onto the document at either the dynamic-document reading section or the static-document reading section, the light source mechanism being stationary under the dynamic-document reading section to irradiate the exposing light onto the document, being moved by the automatic document feeder, through the dynamic-document reading section, or the light source mechanism moving under the static-document reading section to scan the document by irradiating the exposing light through the static-document reading section; and an image-capturing element for receiving a light reflected from the document to convert the image into electronic signals; wherein the exposing light, emitted from the light source mechanism, exhibits a maximum intensity in a direction oriented to the static-document reading section from the dynamic-document reading section.

(15) The image-reading apparatus of item 14, wherein the light source mechanism comprises either a xenon lamp having directivity, or a halogen lamp with a reflector for exhibiting directivity.

(16) An image-forming apparatus comprising the image-reading apparatus of item 14, wherein the image-forming apparatus forms an image on a recording material, based on image data generated by the image-reading apparatus.

(17) An image-reading apparatus-for reading an image formed on a document, comprising: an automatic document feeder for automatically feeding the document; a dynamic-document reading section for reading the image while the automatic document feeder is feeding the document; a static-document reading section for reading the image while the document is put stationary on the static-document reading section; a document-covering member for covering and pushing the document onto the static-document reading section, the document-covering member being capable of opening and shutting with regard to the static-document reading section when the automatic document feeder is opened with regard to the dynamic-document reading section; a light source mechanism for irradiating an exposing light onto the document at either the dynamic-document reading section or the static-document reading section, the light source mechanism being stationary under the dynamic-document reading section to irradiate the exposing light onto the document, being moved by the automatic document feeder, through the dynamic-document reading section, or the light source mechanism moving under the static-document reading section to scan the document by irradiating the exposing light through the static-document reading section; an image-capturing element for receiving a light reflected from the document to convert the image into image data; a reference board for reflecting the exposing light, so that the image-capturing element converts a light reflected from the reference board into compensation data utilized for a shading compensation operation; and a shading compensating section for applying the shading compensation operation to the image data converted by the image-capturing element, based on the compensation data converted by the image-capturing element; wherein the reference board is disposed between the dynamic-document reading section and the static-document reading section.

(18) An image-forming apparatus comprising the image-reading apparatus of item 17, wherein the image-forming apparatus forms an image on a recording material, based on the image data generated by the image-reading apparatus.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
FIG. 1 shows a time-chart of a reading operation, indicating times for activating a lamp.

The image-reading apparatus, embodied in the present invention, will be detailed in the following, referring to the drawings.

Figure 7:
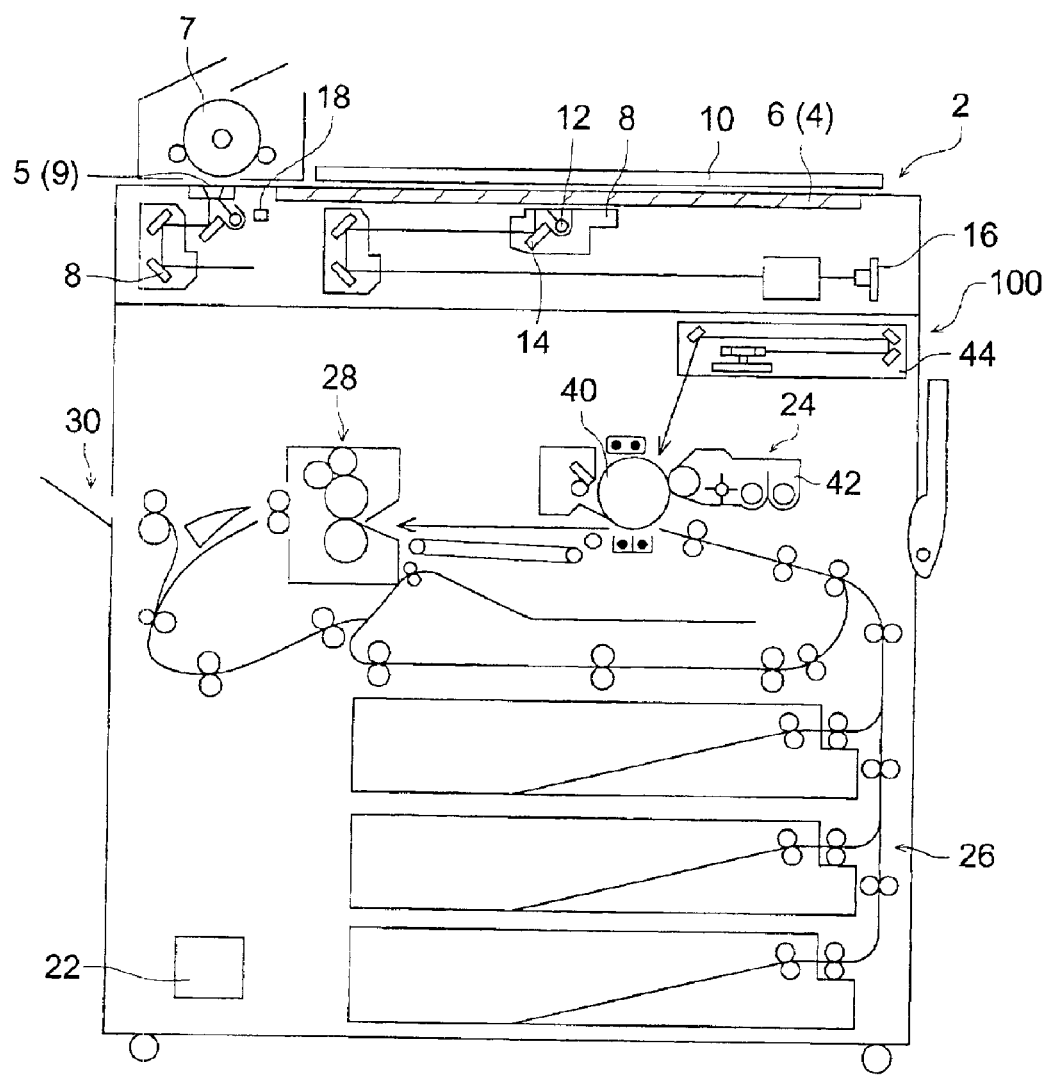
FIG. 7 shows a block diagram of a copier, including an image-reading apparatus embodied in the present invention.

FIG. 7 shows a structural block-diagram of copier 100 (the image-forming apparatus) equipped with image-reading apparatus 2.

Copier 100 comprises image-reading apparatus 2, image-forming section 24, paper-feeding section 26, fixing section 28 and paper-delivery section 30. Image-forming section 24 comprises photoreceptor drum 40, toner-supplying section 42, etc. A required latent image is formed on photoreceptor drum 40 by exposing device 44, and then, the toner image is formed on a sheet, conveyed from paper-feeding section 26, by developing the latent-image with-toner. The toner image on the sheet is fixed by fixing section 28, and then, the sheet is delivered outside from paper-delivery section 30.

Image-forming apparatus 2, which is equipped on the upper section of copier 100, comprises static-document reading section 4 for reading the document put stationary, dynamic-document reading section 5 for reading the document while moving the document. Static-document reading section 4 comprises platen glass 6 for putting the document on it, light source mechanism 8 for irradiating the exposing light onto the image from the downside of platen glass 6, and platen cover 10 for pushing the document onto platen glass 6 from the upper-side of platen glass 6.

Light source mechanism 8, comprising reading lamp 12 and mirrors 14, moves along the longitudinal direction of platen glass 6 to transmit the light reflected from the document to optoelectronic-converting device 16, such as a CCD (Charge Coupled Device), etc., for reading the image on the document. Then, optoelectronic-converting device 16 converts the reflected light including the image information to electronic signals, which are further transmitted to image-forming section 24, etc., through controlling section 22. Sensor 18, serving as a light source position detecting means for detecting light source mechanism 8, is disposed at such a position that, when sensor 18 detects light source mechanism 8, the exposing light emitted from reading lamp 12 does not leak outside from window 9 even if lamp 12 is activated. Incidentally, although it is most desirable that the exposing light does not at all leak outside, it is allowable that a small amount of weak light leaks outside, since such a weak light does not harm human eyes so much, even if a weak light enters into operator's eyes. In this case, it is possible to make window 9 approach platen glass 6, resulting in a minimization of the apparatus. Further, concretely speaking, sensor 18 is disposed at such a position that an illumination intensity measured through window 9 is lower than 5000 1x (desirably, lower than 1000 1x), when reading the image of the document put stationary on platen glass 6 in the state of opening automatic document feeder 7 upward.

Dynamic-document reading section 5 is equivalent to window 9 made of a light transparent material, such as a glass, etc. Automatic document feeder 7 conveys the document to the upper side of window 9, while light source mechanism 8 moves to the lower side of window 9 and stops there to read the image on the document being conveyed (being moved) by automatic document feeder. Incidentally, window 9 is not necessary a transparent member made of a light transparent material, such as a glass, etc., but a simple opening would be also applicable. Further, automatic document feeder 7, being capable of opening and shutting, is attached to copier 100, separating from platen cover 10. Namely, in the present embodiment, automatic document feeder 7 and platen cover 10 are attached to copier 100 so as to be capable of opening and shutting independently each other. It is also applicable, however, that platen cover 10 is capable of opening and shutting with respect to platen glass 6 in the state of opening automatic document feeder 7.

Next, the reading operation of image-reading apparatus 5 will be detailed in the following.

In the first step of reading the document at dynamic-document reading section, automatic document feeder is arranged on the upper surface of copier 100. Then, the operator sets the document on automatic document feeder 7 and pushes the reading start button, etc. to commence the reading operation. Successively, light source mechanism 8 moves to the lower portion of automatic document feeder 7 and opposes to automatic document feeder 7 through widow 9.

When automatic document feeder 7 drives the document into the upper surface of window 9, reading lamp 12 is activated to irradiate the exposing light onto the document, and then, the light reflected from the document is guided to optoelectronic converting device 16 by mirrors 14 to obtain electronic signals of the image.

On the other hand, when reading the document at static-document reading section, the operator puts the document on platen glass 6, and shuts platen cover 10 to push and fix the document onto platen glass 6. Commencing the reading operation by pushing the reading start button, etc., light source mechanism 8 moves under platen glass 6 at a constant velocity. Then, reading lamp 12 successively irradiate the exposing light onto the document, and the light reflected from the document is guided to optoelectronic converting device 16 by mirrors 14 to obtain electronic signals of the image.

In the reading operation mentioned above, reading lamp 12, equipped in light source mechanism 8, is activated at such a position that the exposing light emitted from reading lamp 12 does not leak outside from window 9. In other words, since sensor 18, for detecting the position of light source mechanism 8, is disposed at a predetermined position in static-document reading section, when light source mechanism 8 reaches the predetermined position, a detected signal, detected by sensor 18, is transmitted to controlling section 22, which activates reading lamp 12 to irradiate the exposing light.

FIG. 1 shows a time-chart of the reading operation. As shown in FIG. 1, when the reading operation starts, light source mechanism 8 starts moving (at a1); a command signal for activating reading lamp 12 is outputted from controlling section 22, when sensor 18 detects light source mechanism 8 reaching the predetermined position (at b1); and reading lamp 12 irradiates the exposing light (at c1). Since sensor 18 is disposed at such a position that sensor 18 detects light source mechanism 8 so that the exposing light emitted from reading lamp 12 does not leak outside from window 9, no light leaks outside from window 9 even if reading lamp 12 irradiates the exposing light at this position.

Accordingly, it becomes possible to prevent the leakage of unnecessary light emitted from reading lamp 12 through window 9, when reading lamp 12 is activated in static-document reading section 4.

Incidentally, although the abovementioned configuration is so constituted that sensor 18 is disposed at the predetermined position so as to prevent the leakage of unnecessary light emitted from reading lamp 12, and reading lamp 12 is activated just after sensor 8 detects light source mechanism 8 in midcourse of moving, it is also applicable to control the timing of activating reading lamp 12. For instance, sensor 18 is disposed at a further right side position in FIG. 7, and controlling section 22 controls the timing in such a manner that reading lamp 12 is activated at a time when a predetermined time has elapsed after sensor 18 detects light source mechanism 8 (or when light source mechanism 8 moves a predetermined distance).

Figure 2:
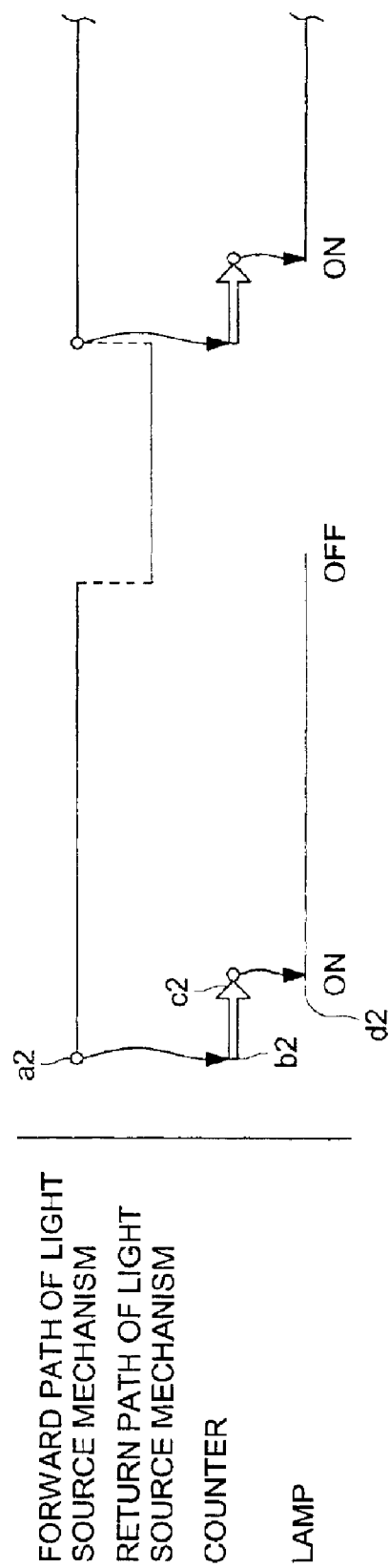
FIG. 2 shows a time-chart of a reading operation, indicating times for activating a lamp.

Concretely speaking, as shown in FIG. 2, when light source mechanism 8 starts moving based on a command signal outputted by controlling section 22 (at a2), controlling section 22 starts counting pulses generated by the motor for driving light source mechanism 8 (at b2); when a number of pulses counted by controlling section 22 reaches a predetermined number (at c2), reading light 12 is activated (at d2). Accordingly, since the moving velocity of light source mechanism 8 is set in advance, it is possible to activate reading light 12 at the predetermined position so that the exposing light emitted from reading lamp 12 does not leak outside from window 9. Incidentally, although the abovementioned configuration is intended to prevent the leakage of unnecessary light emitted from light source mechanism 8 through window 9, it is also possible to make a configuration so as to prevent the leakage through a portion other than window 9.

Further, although the timing of activating reading lamp 12 is controlled, based on the position signal and the elapsed time period in the abovementioned configuration, the operating start position sometimes deviates from the original position, when the reading velocity, namely, the moving velocity of light source mechanism 8 varies depending on changes of the image magnification ratio and/or the reading pitch. In such a case, the start position of activating reading lamp 12 and the elapsed time period are adjusted corresponding to the change of the operating start position. This is because, for instance, when the moving velocity of light source mechanism 8 is increased associating with the change of the image magnification ratio, since a certain time would elapse until the moving velocity of light source mechanism 8 reaches a predetermined moving velocity after light source mechanism 8 starts moving, the operating start position of light source mechanism 8 is shifted to such a position that the moving velocity of light source mechanism 8 reaches the predetermined moving velocity when the reading operation of the document starts, and it is necessary to change the position of light source mechanism 8 and the starting time of counting the operating time in the above process. The abovementioned process is applied not only for the change of the image magnification ratio, but also for the change of the reading pitch in a scanner, etc. as well.

Next, another example will be detailed in the following.

Figure 3:
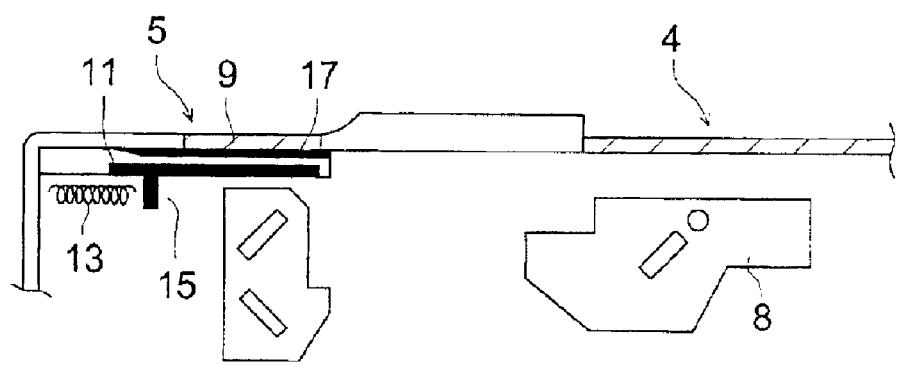
FIG. 3 shows another example of image-reading apparatus.

FIG. 3 shows another example of image-reading apparatus 2. As shown in FIG. 3, shutter 11, serving as a shutter means for masking window 9, is equipped under window 9. Shutter 11 is slidable in a horizontal direction and is urged by spring 13 in a direction of shutting and masking window 9. In addition, shutter 11 equips protrusion 15, which contacts light source mechanism 8 to push and move shutter 11 in a direction of opening window 9, when light source mechanism 8 moves under window 9. When light source mechanism 8 moves into static-document reading section 4, shutter 11 urged by spring 13 shuts and masks window 9 again. Further, cloth 17 is attached on shutter 11 to clean up the inner surface of window 9 every time when shutter 11 moves.

In the abovementioned configuration, when reading the document in dynamic-document reading section 5, window 9 is opened by pushing shutter 11 in a direction of opening window 9 with light source mechanism 8 moving under window 9, and the document, conveyed by automatic document feeder 7 (refer to FIG. 7), is read by the exposing light emitted from light source mechanism 8. On the other hand, when the copier is set for reading the document in static-document reading section 4, light source mechanism 8 moves under the lower portion of static-document reading section 4 and shutter 11 urged by spring 13 shuts and masks window 9. Accordingly, since shutter 11 masks window 9, no light emitted from reading lamp 12 leaks outside through window 9 even if the reading operation is performed in static-document reading section 4 with activating reading lamp 12 of light source mechanism 8. Further, since the inner surface of window 9 is cleaned up by cloth 17 every time when shutter 11 opens and shuts, it is possible to constantly maintain window 9 in a clean state. Incidentally, other than a cloth, a synthetic cloth, an artificial leather and a flocked fabric material can be also employed for the cleaning member.

Next, still another example will be detailed in the following.

Figure 4:
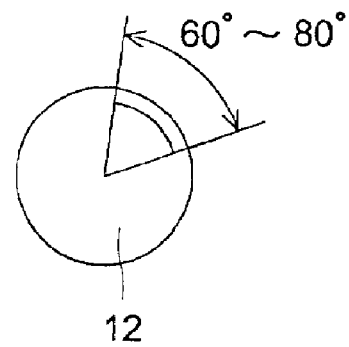
FIG. 4 shows another example of lamps.

In this example, reading lamp 12 having directivity, as shown in FIG. 4, is employed. It is desirable that the illumination angle of the exposing light emitted from reading lamp 12 is regulated in a range of 60°–80°. A xenon-lamp, having directivity itself, can be desirably employed for this purpose as reading lamp 12, since it is possible to regulate its illumination angle. However, when a halogen-lamp is employed for this purpose as reading lamp 12, it is necessary to equip a reflector (also referred to as a cover) for exhibiting directivity in the periphery of the halogen-lamp to regulate its illumination angle. Then, light source mechanism 8 is arranged in such a manner that the maximum intensity component of the exposing light (for illuminating the document), regulated and emitted by from light source mechanism 8, directs to platen glass 6 from the side of window 9. Accordingly, when reading the document put on platen glass 6, since the exposing light, emitted to the document from light source mechanism 8, directs to platen glass 6, no light leaks from window 9 even if automatic document feeder 7 is opened.

A xenon lamp or a halogen lamp, etc, is employed for reading lamp 12. Since the xenon lamp has a narrow and specified irradiating direction, it is possible to set the irradiating direction at a desired direction by simply directing the xenon lamp to the desired direction. On the other hand, since the halogen lamp irradiates light over all circumferential directions, it is necessary to regulate the irradiating direction with the reflector, etc. equipped around the halogen lamp.

Further, it is-also applicable that the reflector, etc., is rotatably equipped around reading lamp 12, so that the irradiating direction of reading lamp 12 can be changed between the reading operations in dynamic-document reading section 5 and static-document reading section 4. For instance, when reading the document in dynamic-document reading section 5, the opening of the reflector directs to the left direction in the drawing, while when reading the document in static-document reading section 4, the opening of the reflector directs to the right direction in the drawing.

In the abovementioned configuration, since the irradiating direction of the exposing light emitted from reading lamp 12 in the reading operation of static-document reading section 4 differs from that in the reading operation of dynamic-document reading section 5, the exposing light is not irradiated toward dynamic-document reading section 5 when reading the document in static-document reading section 4, and no light leaks outside through window 9 of dynamic-document reading section 5.

Next, still another example will be detailed in the following.

Figure 5:
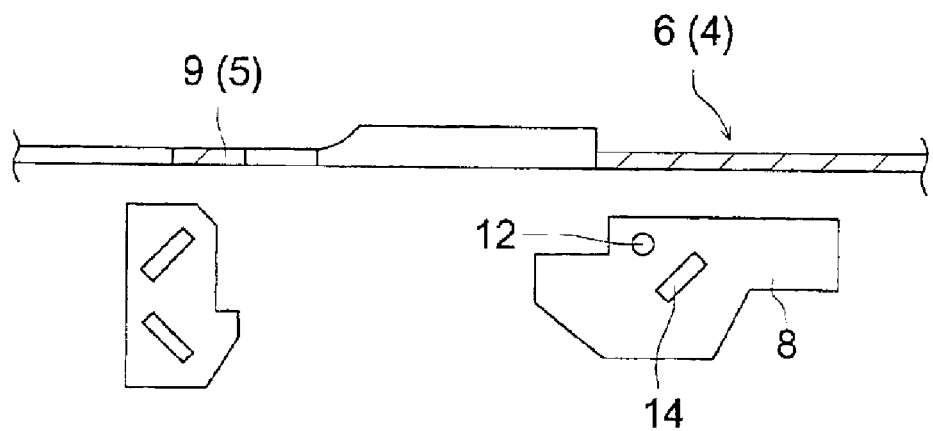
FIG. 5 shows another example of image-reading apparatus.

In this example shown in FIG. 5, white board 20, serving as a reference board having a predetermined length and utilized for a shading compensation operation, is equipped between dynamic-document reading section 5 and static-document reading section 4. White board 20 serves as a reflector for reflecting the exposing light emitted from reading lamp 12 and the sensitivity of the light receiving section (optoelectric converting device 16) is regulated into a uniform sensitivity by changing the sensitivities, etc. based on the reflected light received by the light receiving section. Incidentally, the shading compensation operation is to compensate the unevenness of the light intensity occurred in the longitudinal direction of reading lamp 12, and a shading compensating means comprises a regulating circuit (not shown in the drawings) for regulating the sensitivity of the light receiving section, so that the light reflected from a uniform reflecting surface is received as a uniform luminous intensity at the light receiving section. For instance, when turning on the switch of copy start, light source mechanism 8 is activated under white board 20 to conduct the shading compensation operation before performing the coping operations. Accordingly, since the sensitivity of the light receiving section is regulated by the shading compensation operation, it is possible to read the document in a uniform density even if the unevenness of the light intensity exists in the longitudinal direction of reading lamp 12.

Figure 6:
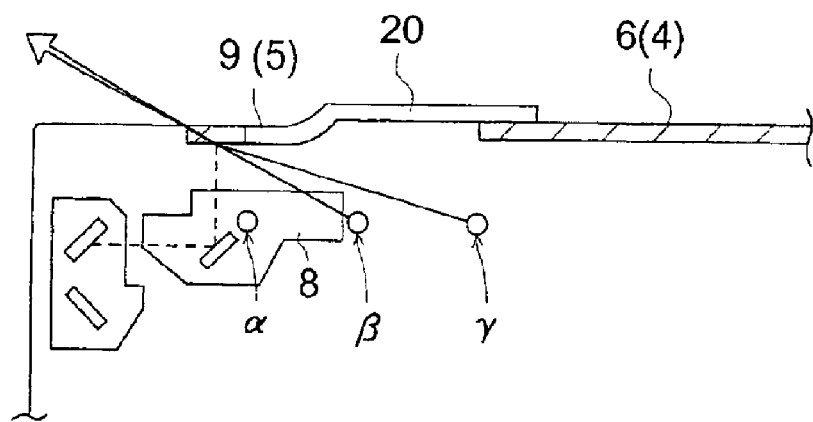
FIG. 6 shows another example of image-reading apparatus.

Since white board 20 has the predetermined length in the moving direction of light source mechanism 8, a gap having the predetermined length is formed between dynamic-document reading section 5 and static-document reading section 4. Accordingly, since dynamic-document reading section 5 and static-document reading section 4 are disposed each other with the predetermined distance between them, even if reading lamp 12 is activated during the reading operation in static-document reading section 4, the exposing light emitted from reading lamp 12 is not directly irradiated to dynamic-document reading section 5, or the intensity of the light arrived there is very weak, resulting in no leakage of unnecessary light through window 9. Concretely speaking in reference to FIG. 6, when reading lamp 12 is activated after moving from position α to position β, some of the exposing light leaks outside through window 9, while when reading lamp 12 is activated at a certain position between position β and position γ, no light leaks outside through window 9, since the incident angle for window 9 becomes small and the distance between window 9 and reading lamp 12 becomes large.

Accordingly, white board 20, equipped between dynamic-document reading section 5 and static-document reading section 4, not only makes it possible to regulate the unevenness of luminous intensity of reading lamp 12, but also makes it possible to prevent the leakage of light through window 9.

Incidentally, although, in the abovementioned examples, copier 100 is exemplified for explaining the image-forming apparatus embodied in the present invention, the scope of the present invention is not limited to copier 100. Needless to say that the image-reading apparatus, embodied in the present invention, can be applied for other apparatus, such as scanners, facsimiles, etc.

As described in the above, according to the present invention, even in the configuration in which the automatic document feeder of the dynamic-document reading section is separated from the platen cover for pushing the document at the static-document reading selection to independently open and shut each of them, no exposing light, emitted from the static-document reading selection, leaks outside from the dynamic-document reading selection.

Disclosed embodiment can be varied by a skilled person without departing from the spirit and scope of the invention.

What is claimed is:

1. An image-reading apparatus for reading an image formed on a document, comprising:

an automatic document feeder for automatically feeding the document;

a dynamic-document reading section for reading the image when the automatic document feeder is feeding the document;

a static-document reading section for reading the image when the document is stationarily placed on the static-document reading section;

a cover member which covers the static-document reading section and which is openable and closable with respect to the static-document reading section when the automatic document feeder is opened with respect to the dynamic-document reading section;

a light source mechanism for irradiating an exposing light onto the document at one of the dynamic-document reading section and the static-document reading section; and a controller for controlling moving and light-emitting actions of the light source mechanism;

wherein, when the document is stationarily placed on the static-document reading section to read the image formed on the document, the controller controls a start timing of light emission from the light source mechanism such that substantially none of the exposing light emitted from the light source mechanism leaks outside through the dynamic-document reading section when the automatic document feeder is opened with respect to the dynamic-document reading section.

2. The image-reading apparatus of claim 1, wherein when said document is stationarily placed on said static-document reading section to read said image on said document, said light source mechanism moves to said static-document reading section from said dynamic-document reading section.

3. The image-reading apparatus of claim 2, wherein when one of: (i) said light source mechanism moves a predetermined distance toward said static-document reading section from a start position located at said dynamic-document reading section, and (ii) a predetermined time has elapsed after said light source mechanism begins to move toward said static-document reading section, said controller activates said light source mechanism to emit said exposing light.

4. The image-reading apparatus of claim 3, wherein said controller changes a value of one of the predetermined distance and the predetermined time in accordance with at least one of a moving velocity of said light source mechanism, the start position of said light source mechanism, and a reading magnification ratio.

5. The image-reading apparatus of claim 2, further comprising a light-source position detector disposed at a predetermined position for detecting said light source mechanism during movement of said light source mechanism;

wherein said controller controls said light-emitting actions of said light source mechanism based on outputs of said light-source position detector.

6. The image-reading apparatus of claim 5, wherein said predetermined position of the light source position detector is a detecting position at which said light-source position detector detects said light source mechanism during movement of said light source mechanism between said dynamic-document reading section and said static-document reading section.

7. An image-forming apparatus comprising the image-reading apparatus of claim 1, wherein said image-forming apparatus forms an image on a recording material based on image data generated by said image-reading apparatus.

* * * * *